United States Patent
Augst et al.

(10) Patent No.: US 12,233,893 B2
(45) Date of Patent: Feb. 25, 2025

(54) PEDAL SYSTEM FOR A VEHICLE DESIGNED TO BE DRIVEN IN AN AT LEAST PARTLY AUTOMATED MANNER

(71) Applicant: Bayerische Motoren Werke Aktiengesellschaft, Munich (DE)

(72) Inventors: Alexander Augst, Munich (DE); Reiner Friedrich, Grasbrunn (DE); Claus Dorrer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 288 days.

(21) Appl. No.: 16/119,764

(22) Filed: Aug. 31, 2018

(65) Prior Publication Data
US 2018/0370546 A1    Dec. 27, 2018

Related U.S. Application Data (63) Continuation of application No. PCT/EP2017/054320, filed on Feb. 24, 2017.

(30) Foreign Application Priority Data

Mar. 2, 2016    (DE) .................... 10 2016 203 395.6

(51) Int. Cl.
*B60W 50/00*    (2006.01)
*B60K 26/02*    (2006.01)
(Continued)

(52) U.S. Cl.
CPC .......... *B60W 50/14* (2013.01); *B60K 26/021* (2013.01); *B60W 30/10* (2013.01); *B60W 50/12* (2013.01);
(Continued)

(58) Field of Classification Search
CPC ...... B60W 50/14; B60W 30/10; B60W 30/16; B60W 50/12; B60W 2554/00;
(Continued)

(56) References Cited

U.S. PATENT DOCUMENTS

| | | | |
|---|---|---|---|
| 6,302,823 B1 | 10/2001 | Eckert et al. | |
| 2012/0209488 A1* | 8/2012 | Nagaya | B60W 50/087 701/70 |
| 2016/0303972 A1 | 10/2016 | Kuehne | |

FOREIGN PATENT DOCUMENTS

| | | |
|---|---|---|
| DE | 197 53 764 A1 | 6/1999 |
| DE | 10 2012 002 318 A1 | 8/2013 |

(Continued)

OTHER PUBLICATIONS

International Search Report (PCT/ISA/210) issued in PCT Application No. PCT/EP2017/054320 dated Jun. 23, 2017 with English translation (eight pages).
(Continued)

*Primary Examiner* — Tiffany P Young
(74) *Attorney, Agent, or Firm* — Crowell & Moring LLP (57) ABSTRACT

A pedal system for a vehicle that is configured to be driven in an at least part-automated manner. The pedal system includes a driving pedal and a brake pedal. The pedal system is allocated a representation function between a pedal actuation and control parameters for the longitudinal control of the vehicle. The pedal system is configured so as, when the vehicle is being operated, to vary the representation function between the pedal actuation and the control parameters for the longitudinal control of the vehicle in dependence upon a variable that represents the degree of automation of the driving mode of the vehicle and at least a first condition for restricting the representation function of the pedal actuation
(Continued)

and/or at least a second condition for eliminating the restriction of the representation unction of the pedal actuation.

15 Claims, 2 Drawing Sheets

(51) Int. Cl.
*B60W 30/00* (2006.01)
*B60W 30/10* (2006.01)
*B60W 50/12* (2012.01)
*B60W 50/14* (2020.01)
*B60W 60/00* (2020.01)

(52) U.S. Cl.
CPC ..... *B60W 60/0053* (2020.02); *B60W 2540/10* (2013.01); *B60W 2540/18* (2013.01); *B60W 2540/22* (2013.01); *B60W 2540/229* (2020.02); *B60W 2540/26* (2013.01); *B60W 2554/00* (2020.02)

(58) Field of Classification Search
CPC ......... B60W 2540/10; B60W 2540/18; B60W 2540/22; B60W 2540/26; B60K 26/021

USPC .......................................................... 701/70
See application file for complete search history.

(56) References Cited

FOREIGN PATENT DOCUMENTS

| DE | 10 2013 019 141 A1 | 5/2015 |
| DE | 10 2013 019 202 A1 | 5/2015 |
| EP | 2 604 462 A1 | 6/2013 |
| JP | 2000-54860 A | 2/2000 |
| WO | WO 2005/105508 A1 | 11/2005 |

OTHER PUBLICATIONS

German-language Written Opinion (PCT/ISA/237) issued in PCT Application No. PCT/EP2017/054320 dated Jun. 23, 2017 (six pages).

German-language Search Report issued in counterpart German Application No. 10 2016 203 395.6 dated Feb. 28, 2017 with partial English translation (11 pages).

\* cited by examiner

PEDAL SYSTEM FOR A VEHICLE DESIGNED TO BE DRIVEN IN AN AT LEAST PARTLY AUTOMATED MANNER

CROSS REFERENCE TO RELATED APPLICATIONS

This application is a continuation of PCT International Application No. PCT/EP2017/054320, filed Feb. 24, 2017, which claims priority under 35 U.S.C. § 119 from German Patent Application No. 10 2016 203 395.6, filed Mar. 2, 2016, the entire disclosures of which are herein expressly incorporated by reference.

BACKGROUND AND SUMMARY OF THE INVENTION

Embodiments of the invention relate to a pedal system for a vehicle that is configured so as to be driven in an at least part-automated manner, wherein the pedal system comprises a driving pedal and a brake pedal. Moreover, the embodiments of the invention relate to a vehicle having such a pedal system, to a method for controlling a pedal system and also to a computer program product.

Vehicles are ever-increasingly being provided with driver assist functions that render it possible for the vehicle to be driven in an assisted, part-automated, highly automated or fully automated manner, for example in order to relieve the drive of routine tasks or to assist the driver in critical situations. The higher the degree of automation, the greater the demands placed on the sensors, actuators and computing units that assist the driving function. For reasons of safety, for example in the event of an unsafe state or a driving function that is being performed in a manner that is not as expected by the driver, but also if a set of rules have not yet been developed regarding who or what is to accept responsibility in the event of an accident, it is therefore necessary for the driver of such a vehicle to be able to assume control of the vehicle within a short space of time.

By way of example, numerous variants of proximity-dependent velocity control functions (Adaptive Cruise Control) and a steering assist system or a congestion assistant are known. Such driver assist functions are able to actively engage in the longitudinal control of the vehicle or to at least in part assume said longitudinal control. Driver assist functions are also known that actively engage in the lateral control of the vehicle or at least in part assume said lateral control. Moreover, driver assist functions are also able to assume a multiplicity of driving tasks up to driving the vehicle in a highly automated or automated manner. Such systems currently offer a greatly varying degree of automation. In addition, the (actual useable) degree of automation may vary within a route owing to diverse boundary conditions.

In the case of vehicles currently on the market, it is possible for the driver by increasing the force when operating the operating elements (driving pedal and/or brake pedal, steering wheel) to overrule (override) an automated longitudinal or lateral control of the vehicle. By way of example, it is possible during a steering procedure that is performed autonomously by the vehicle for the driver by means of an increased manual steering torque to "override the steering function". In a similar manner, when the vehicle is performing an acceleration procedure, it is possible for the driver by means of depressing the driving pedal more intensely to instigate a greater acceleration of the vehicle.

A disadvantage of the currently known vehicles resides in the fact that there is no guarantee that the driver will be able to rapidly and intuitively assume the operation of the driving pedal and adjust the correct operating element with or without a prevailing take-over request (TOR). Furthermore, there is the risk of an incorrect operation in the event that, following a longer period of non-operation of an operating element (for example of the driving and/or brake pedal), the driver possibly mistakes the pedal that is to be operated or mixes up the pedals. This may by way of example be the case if as a result of the vehicle being driven in an autonomous manner the driver is very relaxed or even sleepy.

Part-automated and highly automated driving systems of a vehicle are currently configured in such a manner that when the driver essentially intervenes into the vehicle control, the automated driving function is switched off. If the vehicle is controlling in an automated manner by way of example a velocity that is to be maintained in dependence upon the traffic ahead, the automated driving function is switched off by means of the driver actuating the brake.

There is a need for a conclusive solution for a co-joint control of a vehicle having at least in-part automated longitudinal control by the driver, for example for the case that it is necessary for the driver or that the driver wishes to assume at least the longitudinal control of the vehicle in a short space of time, preferably that this leads to the driver assist function being switched off or interrupted.

This and other objects are achieved by a pedal system for a vehicle that is configured so as to be driven in an at least part-automated manner, wherein the pedal system comprises at least one driving pedal and a brake pedal. A representation function between a pedal actuation and control parameters for the longitudinal control of the vehicle is allocated to the pedal system. The pedal system is configured in such a manner that when the vehicle is being operated said pedal system varies the representation function between the pedal actuation and the control parameters for the longitudinal control of the vehicle in dependence upon one of the variables of the travel of the vehicle that represent the degree of automation and at least of a first condition regarding a first change, in particular a restriction, to the representation function of the pedal actuation and/or at least a second condition regarding a second change, in particular to eliminating the restriction, the representation function of the pedal actuation. The resulting control parameters that are dependent upon the pedal actuation may be processed as control parameters. By way of example, a control parameter may also be a desired variable which represents the vehicle acceleration and/or velocity and/or rotational speed and is transmitted to the driver of the vehicle.

The embodiments of the invention render it possible to exert specific influences on the vehicle control function if the vehicle is controlled in an at least in-part automated manner. In particular, the driver may make specific maneuver decisions without, in so doing, activating the automatic driving function and without risking the operating elements being mixed-up or the driver making an error.

The pedal system renders it possible to have an intelligent interaction between an automated driving mode and a manual driving mode. The vehicle allows an intelligent co-joint control function, in particular of the longitudinal dynamics of the vehicle. The pedal travel may be used in a similar manner to which the representation characteristic curves may be adjusted to suit, with the aim of allowing driver involvement with maximum protection.

The pedal system may be configured in such a manner that dangerous consequences do not occur even in the case of a sudden, desired or necessary transition from a (part)automated driving mode into a manual or at least in-part manual mode also in the case of the driver possibly making operating errors. The pedal system may be configured in such a manner that such a co-joint control of the longitudinal control of the vehicle with at least one pedal of the pedal system (with a varied or restricted representation function) does not automatically lead to the driver assist function being switched off or interrupted.

The driving pedal and the brake pedal may be separate operating elements of the pedal system. Likewise, the driving pedal and the brake pedal may be configured by means of a universal pedal so as to control the acceleration and the deceleration of the vehicle. It is in particular possible to provide that the pedal system comprises at least one operating element so as to continuously control the longitudinal control of the vehicle by hand. It is thus by way of example not necessary for the pedals or operating elements of the pedal system to be operated by one or more feet. On the contrary, it is also possible to perform the operation using one or two hands.

The term "representation function of the pedal actuation procedure" is understood to mean the representation of a pressure force on the relevant pedal and/or a pedal position, in particular a pedal angle, in a longitudinal control of the vehicle. The representation function of the pedal actuation procedure is expressed by means of a mathematical correlation, by way of example in the form of one or more characteristic curves, of coefficients of a formula or of values that are stored in a look-up table. The mathematical correlation may comprise time values or parameters that represent one or more temporal behavior parameters of the representation function of the pedal actuation procedure on the longitudinal control of the vehicle. The mathematical correlation may be stored in a computing unit or a storage device of the pedal system.

The variation of the representation function is understood to be a change in the mathematical correlation of the representation function of the pedal actuation, for example a change in the above mentioned characteristic curve.

The procedure of restricting the representation function comprises excluding an excessively high acceleration or deceleration or any excessively rapid increase in acceleration or braking force. The procedure of restricting the representation function of the pedal actuation likewise comprises restricting or changing the mentioned criteria. It is thus possible when a specific degree of automation of the vehicle is realized to use the first representation function that causes a restriction of the representation function of the pedal actuation in the longitudinal dynamics and the second condition for overriding purposes so as to return to the original representation function without restricting the representation function of the pedal actuation.

In particular, it is possible as a result in order to vary the representation function of the pedal actuation for different degrees of automation to apply or use different first and/or different second conditions.

This approach is based on the consideration that the actuation of the driving pedal or of the brake pedal, for example in the form of a pressure force or a pedal angle, is implemented differently in dependence upon other conditions when the vehicle is being driven at least in-part in an automated manner. The representation function is varied depending upon the situation. By way of example, multiple parameters of the respective representation function, for example at least two different increases in the control parameters for at least two different value ranges, which represent an actuation (for example of the pedal angle) at least of one operating element, are changed, in particular restricted.

The variation of the representation function may occur selectively and differently for the different operating elements of the pedal system. A selective restriction of a resulting vehicle reaction (i.e., of the effects of the pedal actuation) when the pedal is being actuated may likewise be provided.

The representation function of the pedal actuation may adopt at least two operating states (modes). A first operating state relates essentially to a manual or assisted driving mode. The second operating state relates to a part-automated or highly automated driving mode. The transitions between the modes may occur in dependence upon the first and/or the second condition.

In accordance with one embodiment, the pedal system comprises a means for ascertaining one or multiple parameters of a driving situation; ascertaining a measure of the restriction of the representation function for the pedal system or the driving pedal and/or the brake pedal in dependence upon the parameter or parameters that are ascertained for the driving situation; varying the representation function between a pedal actuation and the longitudinal control of the vehicle for the pedal system or the driving pedal and/or the brake pedal in dependence upon the ascertained measure of the restriction.

Possible parameters of the driving situation are in particular one or multiple time periods up to a collision (so-called time-to-collision, TTC) to one or multiple objects, in particular traffic participants. It is expedient if the representation function of the two pedals is adjusted in particular in an interdependent manner.

In one expedient embodiment, the measure of the restriction may be dependent upon a necessity that is established using other means of the vehicle, and/or upon a potential danger and/or a recommendation for action to perform a specific maneuver. A maneuver may be an (intense) braking action or an (intense) accelerating action, by way of example for an overtaking maneuver, a merging procedure or a necessary braking procedure. Generally, a maneuver is any maneuver that requires or necessitates intervention in a longitudinal control of the vehicle. By way of example, the maneuver may be an overtaking maneuver, lane-changing maneuver, turning maneuver, shunting maneuver, parking maneuver. This involves in an expedient manner providing the driver of the vehicle with information regarding a corresponding maneuver and/or a corresponding instruction to perform an action.

Further, there is a predefined mathematical correlation between the restriction of the representation function of the pedal actuation for the driving pedal and the restriction of the representation function of the pedal actuation for the brake pedal. This means that the restrictions for the driving pedal and the brake pedal may be dependent upon one another. The mathematical correlation may comprise time-dependent parameters, such as for example time constants. By way of example, a change, in particular a restriction, of the representation function for the driving pedal may occur later and/or only after a further condition has been verified. The behavior of the two pedals may also be configured in such a manner that after one of the pedals has been operated owing to a specific operation the representation function of the other pedal changes.

Alternatively or in addition thereto, it is possible for different combinations of one first condition or multiple first conditions and/or one second condition or multiple second conditions and their parameters to occur. It is thus possible to take into consideration one or multiple first conditions in which the two pedals both change into a manual or automated operating mode and simultaneously one or multiple second conditions, in which only one pedal changes condition or changes back to the previous condition.

Further, the pedal system is configured so as to ascertain from a measure of an anticipated success at least of a specific maneuver in particular with regard to the prevailing traffic situation and/or or prevailing conditions within or outside the vehicle, wherein the restriction at least of one representation function is dependent upon an ascertained measure of the anticipated success of the specific maneuver.

It is possible in particular using other means of the vehicle to determine a measure of an anticipated success of a specific maneuver, in particular with regard to the prevailing traffic situation and/or or prevailing conditions within or outside the vehicle. Such an anticipated success may be determined in dependence upon probability values for a success, failure or a discontinuation of a maneuver. The pedal system may determine the corresponding information or rather the information that corresponds to the measure of an anticipated success of the specific maneuver, in particular by means of reading in said information.

In the event that a maneuver that may be performed in an at least in-part automated manner has a high measure of success (greater than a specific measure), it is possible for the representation function to be restricted to a greater, in particular significant, extent.

In the event that a maneuver that may be performed in an at least in-part automated manner has a low chance of success (below a specific measure), it is possible for the representation function not to be restricted at all or to be restricted to a less extent, in particular the limitation of the representation function may be reduced to a specific measure.

Further, the at least one second condition for the driving pedal and the brake pedal comprises a take-over request with regard to the longitudinal control of the vehicle that is to be performed by the driver. The take-over request may be generated using means of the vehicle, for example using the system for performing the at least in-part automated driving function, and/or transmitted to the driver via a human-machine interface. This may be performed for example in dependence upon the fact that the degree of automation has reduced or is expected to reduce and/or in dependence upon the currently prevailing traffic situation.

The take-over request may be a so-called Take-Over-Request (TOR) or a Hands-On-Request (HOR) or an explicit request to operate a specific pedal and/or the steering wheel of the vehicle. In the case of an HOR, the driver is requested to place his hands and/or feet on relevant operating elements in order to be able to intervene in a correcting manner where necessary.

Such a procedure may be expedient if an "essential driving task" is to be performed with regard to a longitudinal and/or lateral control of the vehicle. Such an essential driving task may be an acceleration or deceleration of the vehicle which is desired by the driver and which is additional to one already implemented by the at least in-part automated driving mode and which is to be performed or undertaken in addition to or in relation to the acceleration or deceleration that is specified by the vehicle automation system.

An additional acceleration or deceleration may be superimposed in an additive, multiplicative or logarithmic manner on the acceleration that is already requested by the vehicle automation system. The second condition may be dependent upon a level of urgency of the take-over request or criticality of a prevailing traffic situation or a traffic situation that is to be expected in the near future.

In accordance with a further expedient embodiment, the at least one second condition for the driving pedal and/or for the brake pedal comprises taking over a with regard to a lateral control of the vehicle that is to be performed by the driver of the vehicle currently or in the future, in particular a readiness to steer and/or a steering action. The second condition that eliminates a restriction of the representation function of a pedal is established if a steering wheel sensor detects a gripping force and/or a specific steering action. The readiness to steer may be detected by means of a so-called hands-on sensor on the steering wheel and/or with the aid of a camera that is arranged in the interior compartment of the vehicle. Such sensors, for example on a capacitive basis, are known to the person skilled in the art. The steering action may be detected by means of a steering angle sensor or a steering force detector.

The second condition is present by way of example if it is established that the force gripping the steering wheel is exceeding a specific measure, for example on one or two positions of the steering wheel and if it is established that a simultaneous force influence is being exerted on one of the pedals by means of the foot of the driver.

A (non-round) operating element, for example a joy stick, for controlling the steering or lateral dynamics of the vehicle, may also be understood within the scope of this description as the steering wheel.

Further, the at least one first condition and/or the at least one second condition is dependent upon a state of alertness of the driver. The state of alertness may be a general state of alertness of the driver that is determined using means of the vehicle. For this purpose, it is possible by way of example to install an internal compartment camera that detects the driver of the vehicle. It is possible in the case of the state of alertness to differentiate between the alertness via different sensual perceptions or perception channels of the driver. It is expedient if a differentiation occurs that relates to specific lane regions and/or objects. Objects may be currently relevant traffic participants, a vehicle that is located ahead of the vehicle involved or also a vehicle that is being driven to the rear of the vehicle involved.

Further, the pedal system is configured so as to vary the representation of the pedal actuation of the driving pedal and/or of the brake pedal in a longitudinal control of the vehicle in dependence upon a current and preceding procedure of monitoring the specific spatial regions in the area surrounding the vehicle. As a consequence, it is possible in addition to verify whether the driver is actually looking at the roadway or has looked at the roadway before the representation of the pedal actuation is varied or a transition at least of one pedal into a manual mode occurs. It is thus possible for example using eye-tracking to verify whether the driver has looked at a roadway region and/or an object on the roadway or in the rearview mirror, which is relevant for performing an acceleration procedure or braking procedure.

Further, the pedal system is configured so as in dependence upon the pedal actuation to vary, in particular restrict, the mechanical movability at least of one of the pedals. In order to restrict the mechanical movability, at least one of the pedals is held within predetermined position limits. For example, the relevant pedal may be moved by the driver first by means of an increased pressure outside the predetermined position limits. The position limits may relate to the pedal angle, for example one or multiple pedal angle regions. Moreover, the position may be a three-dimensional position, for example sliding, rotating, rolling or a parallel upstroke. The restriction in the form of locking a pedal may be performed within predetermined limits.

Such position limits may be defined for at least one automated driving mode of the vehicle outside the position limits that are defined as an at least in-part manual driving procedure by the driver. The restriction or the locking procedure may comprise a mechanical latching procedure and/or a movement restricting procedure. The restriction also comprises an essentially increased movement resistance of the pedal. The predetermined position limits or the locking procedure may affect one or multiple degrees of freedom of the pedal.

A restriction of the representation function may affect the operating behavior of at least the one (relevant) pedal, either in company with or temporally offset from the procedure of locking the pedal. The change in the operating behavior may be provided by way of example in the pedal system as a consequence of the locking procedure and/or by means of a corresponding electronic control procedure that is performed simultaneously so as to generate or modify the control signals.

Further, the pedal system is configured so as, in the event of the representation of the pedal actuation being varied, to perform an essential reduction in the pedal resilient force and/or to retract at least one pedal. This renders it possible for the pedal to be essentially decoupled from the control of the acceleration or deceleration procedure and to be moved automatically or by means of an intervention by the driver into a changed position. By way of example, the pedal may be retracted or folded in.

Further, the pedal system is configured so as in dependence upon a variable of the travel of the vehicle, said variable representing the degree of automation, to vary one of the following parameters:
at least one position limit when the at least one pedal is locked;
at least one pedal resilient force;
the position of the pedal in a retracted state.

The pedal system may be configured so as to vary these parameters in dependence upon the variable that represents the degree of automation in at least two stages and quasi continuously. The restriction of the representation function and/or the movability at least of one pedal is greater when the degree of automation is higher than when the degree of automation is low. Also, the pedal resilient force may increase with an increasing amount continuously or in at least two stages for the degree of automation.

It is possible by way of example to provide that the locking arrangement is eliminated or the resilient force is varied in a continuous manner or at least in two stages. At least one parameter of the varied resilient force or of the elimination of the locking arrangement, in dependence upon a qualitative and/or quantitative parameter, may be in particular in association with the first condition and/or the second condition. It is possible in particular to provide that the at least one parameter of the elimination of the locking arrangement is configured as a time interval that characterizes the time until at least one first specific eliminating state or a specific phase of the elimination of the locking arrangement is achieved.

In other words, a locked pedal may also be "relaxed" in stages or stages that are offset with respect to time, i.e., made available for the driver to move or operate.

The locking arrangement may be eliminated in dependence upon which second condition or combination of at least two second conditions is prevailing and/or which quantitative parameter of the second condition is established.

The variable that represents the degree of automation within the scope of the description may be a prevailing degree of automation or a degree of automation that is specific for the immediate future (1-30 seconds) or the corresponding variable.

By way of example, the variable that represents the degree of automation may be assumed to be high if the degree of automation increases and is above a specific measure and/or may be assumed to be low if the degree of automation reduces and is below a predetermined measure. It is particularly preferred that a measure of the degree of automation that is cumulative over time may be taken into consideration.

By way of example, measures or category values that are defined according to the VDA (German Automobile Association) may be used as the variables that represent the degree of automation. By way of example, these classes or category values may be for the following degrees of automation:
A1: Assisted driving mode;
A2: Part-automated driving mode;
A3: Highly automated driving mode;
A4: Automated driving mode;
A0: Degree of automation unknown or low statement-confidence.

Moreover, the variable that represents the degree of automation takes into consideration individually, selectively or in specific combinations specific aspects of the achievable or suitable degree of automation. By way of example, a variable that represents the degree of automation of the driving mode may also be selective with regard to at least two different aspects of the automation of the movement of the vehicle and/or for two or multiple different driver assist functions of the vehicle in the control unit, e.g., with regard to: a longitudinal control of the vehicle and/or a lateral control of the vehicle and/or changing lanes and/or performing an overtaking maneuver and/or driver information, in particular in conjunction with the vehicle control.

All described features of the invention may be used separately and differently for different aspects of automation.

The variable that represents the degree of automation may also be determined and/or taken into consideration in dependence upon the instructions of the driver and/or upon stored operating history of the driver and/or upon parameters that are stored in a back end storage system and may be called-up by the vehicle or upon other expedient criteria (e.g., type of road etc.).

The inventive device is configured so as to determine a variable that represents the degree of automation of the vehicle for the current degree of automation that is prevailing in the time interval of +/−2 seconds and/or for the degree of automation that is prevailing in the near future of approx. 1-30 seconds. In particular, the pedal system may be configured so as to determine, in particular read in, a measure of the degree of automation from other devices within or outside the vehicle.

A further expedient embodiment provides that the second condition is at least one of the pedals in dependence upon the preceding first condition of the same pedal and/or of the respective other pedal. In the case of this embodiment, at least one of potentially multiple conditions for eliminating the restriction of the representation function of a pedal may be dependent at least in part upon a reason for which the pedal was previously restricted. It is thus possible for a variation of the representation function of a pedal that is being performed for safety reasons to only be eliminated if the driver is for example sufficiently awake or alert.

Moreover, in order to achieve the solution, a vehicle is proposed that comprises means for the at least part-automated driving mode and a pedal system, wherein the pedal system is configured in accordance with the aforementioned description. The vehicle has the same advantages as those that have been explained above in connection with the pedal system in accordance with the invention.

Moreover, the inventive method for controlling a pedal system for a vehicle that is configured so as to be driven in an at least part-automated manner, wherein the pedal system is configured in accordance with the above description. The method comprises the steps of: allocating a representation function between a pedal actuation and control parameters for the longitudinal control of the vehicle; varying the representation function between the pedal actuation and the control parameters for the longitudinal control of the vehicle when the vehicle is being operated, in dependence upon a variable that represents the degree of automation of the vehicle, and upon at least a first condition for restricting the representation function of the pedal actuation and/or at least a second condition for eliminating the restriction of the representation function of the pedal actuation.

The method may be further configured in accordance with the above description.

Finally, a computer program product is proposed that may be loaded directly into the internal storage device of a digital computer and comprises software code sections that are used to perform the steps of the method described here if the product is running on the computer.

The computer is in particular a computing unit of the vehicle. The computer program product may be stored on a storage medium, such as for example a USB memory stick, a DVD, a CD-ROM, a hard drive or the like. Likewise, the computer program product may be transmitted via a communication connection (in a wireless or wire-connected manner).

The inventive method has the same advantages as those that have been described above in connection with the pedal system in accordance with the invention.

The inventive pedal renders it possible for the driver to effective co-jointly control the vehicle when the vehicle is being driven in an automated mode without having to switch off the active driver assist function or without having to interrupt said active driver assist function for a significant period of time. As a consequence, the comfort for the driver is considerably increased and the driver is able to operate the vehicle in an intuitive manner. A further advantage resides in the fact that the time periods for the driver to take over ("driver-to-the-loop") are reduced because the foot or the hand of the driver is already on the correct operating element (pedal) prior to taking over the driving function. This results in expedient relationships in the interaction of the driver with the pedal system.

The vehicle is in particular a motor vehicle (passenger car, commercial vehicle, transporter or possibly a two wheel vehicle, for example a motorbike). This results in multiple advantages that are described in this document and other advantages that are easily reproducible by the person skilled in the art. Furthermore, the vehicle may also be a waterborne vehicle or an aircraft or spacecraft, wherein the pedal system is configured accordingly in an expedient manner.

Other objects, advantages and novel features of the present invention will become apparent from the following detailed description of one or more preferred embodiments when considered in conjunction with the accompanying drawings, in which:

DETAILED DESCRIPTION OF THE DRAWINGS

Figure 1:
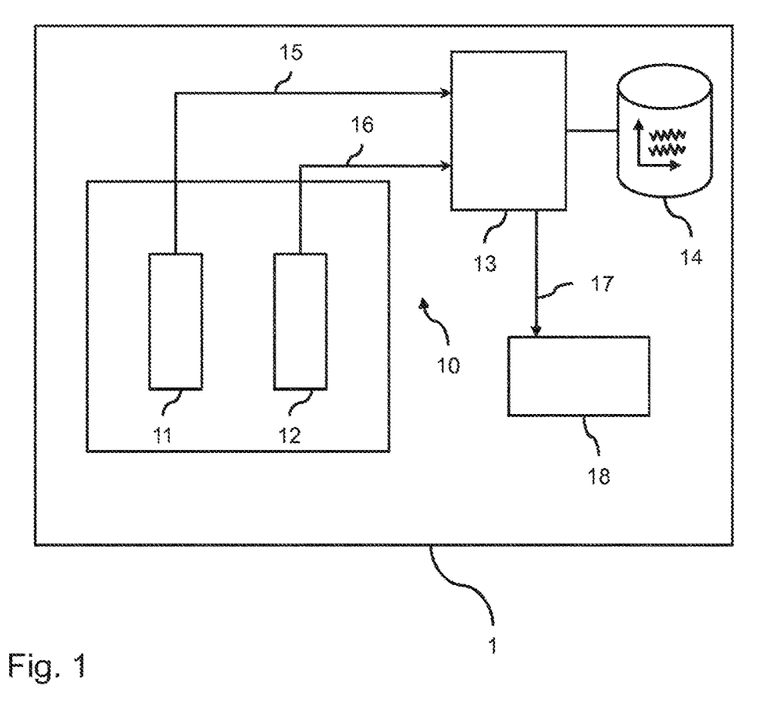
FIG. 1 is a schematic view of a pedal system that is configured so as to be driven in an at least part-automated manner.

FIG. 1 illustrates an inventive pedal system 10 for a vehicle 1 that is configured so as to be driven in an at least part-automated manner. By way of example, the pedal system 10 comprises a driving pedal 11 and a brake pedal 12. Alternatively, the pedal system could comprise a universal pedal for controlling the acceleration and deceleration of the vehicle 1. Fundamentally, each operating element that is also suitable for a continuous control of the longitudinal control of the vehicle by hand is understood to be a pedal system in terms of the invention. This is known under the term "handgas".

Corresponding signals 15, 16 are transmitted to a computing unit 13 of the pedal system in dependence upon a respective position and/or dynamic movement of the driving pedal 11 or brake pedal 12. The signal 16 represents the position or movement of the driving pedal. The signal 16 represents the position or movement of the brake signal. The computing unit 13 is connected to a storage device 14 which stores one or multiple representation functions between a pedal actuation of the driving and/or the brake pedal 11, 12 and control parameters for the longitudinal control of the vehicle. The computing unit 13 is configured so as to read out from the storage device 14 the representation functions that are stored or stored in the storage device 14, to process said representation functions and as a result of the processing procedure transmit a control parameter 17 to a further computing unit 18 so as to longitudinally and/or laterally control the vehicle. The computing unit 18 for its part is connected to the systems (for example actuators, sensors and the like), not further illustrated in the figure, so as to drive the vehicle 1 in an at least part-automated manner.

The representation function between a pedal actuation of the driving pedal 11 and/or of the brake pedal 12 and the longitudinal control of the vehicle is also described in this description as a representation of the pedal operation and illustrates the representation, i.e., implementation or conversion, of the pressure force onto the relevant pedal and/or its pedal position, in particular in the form of a pedal angle, into a longitudinal control of the vehicle. The representation function may be stored as a mathematical correlation for example of one or multiple characteristic curves, coefficients of a formula or parameters in a look-up table. The correlation may comprise time values or characteristic values that represent one or multiple temporal behavior parameters of the representation of the pedal operation on the longitudinal control of the vehicle. Such a correlation is indicated schematically in the storage device 14.

The representation function of the pedal operation may assume at least two operating states (modes). These are an operating state for the essentially manual or only assisted driving mode and a second operating state for a part-automated or highly automated driving mode. Transitions between the two operating states may occur in dependence upon a first and/or a second condition.

The variation of the representation function represents an essential change of the mathematical correlation of the representation function, i.e., of the representation of the pedal operation. In specific terms, this means the modification of the characteristic curve or of a characteristic curve that is stored in the storage device. The variation is performed in dependence upon a measure of the degree of automation of the vehicle and also upon at least one first condition for restricting the representation of the pedal operation and/or at least a second condition for eliminating the restriction of the representation of the pedal operation. If the representation of the pedal operation is restricted, it is not possible for excessively high acceleration or braking to occur or for an increase in the acceleration or braking force that is too rapid to occur or such actions are restricted or converted in a predetermined manner. By way of example, in the event that a specific degree of automation of the driving mode is achieved, a first representation function is used that causes a restriction of the pedal operation in the longitudinal dynamics of the vehicle. If a second condition is present, the restriction is eliminated and the system returns to the original representation function without restricting the representation of the pedal operation.

It is possible to provide different first and/or different second conditions so as to vary the representation of the pedal operation for different degrees of automation.

The pedal system may be controlled with reference to parameters of a specific driving situation. For this purpose, means of the vehicle are used to ascertain one or multiple parameters of the driving situation. This may be by way of example a so-called time-to-collision to one or multiple objects, in particular traffic participants. The corresponding means are not illustrated in FIG. 1. Subsequently, the measure of the restriction of the representation function for the pedals 11, 12 of the pedal system is ascertained in dependence upon the ascertained parameters of the driving situation. Subsequently, the representation function between a pedal actuation and the longitudinal control of the vehicle for the driving pedal and/or the brake pedal is varied in dependence upon the ascertained measure of the restriction. It is expedient to adjust the representation functions both of the driving pedal 11 and also the brake pedal 12 is varied in dependence upon one another. By way of example, it is established in dependence upon scanning the surrounding area that the influence of the driver on the brake pedal or the driving pedal may be counter-productive in the case of a dynamic maneuver of the vehicle that is necessary for safety reasons. In this case, the representation function of the relevant pedal 11, 12 produces a weakened representation of the pedal angle or of the pressure force on the actual longitudinal control so as to achieve the necessary acceleration values in a specific value range. Alternatively, the pressure force and/or pedal angle required so as to achieve a full or target braking action may be increased.

The pedal system may be configured in such a manner that there is a predefined mathematical correlation between the restriction of the representation of the operation of the driving pedal and the restriction of the representation of the operation of the brake pedal. This means that the restriction of the representation function for the driving pedal and the restriction of the representation function for the brake pedal are dependent upon one another. This may be realized by way of example via the mathematical correlation and time-dependent parameters. In other words, the behavior of the two pedals 11, 12 is such that after one of the pedals has been operated the representation function of the other pedal changes.

For example, it is possible in the case of a high and increasing degree of automation to select the pressure force and/or pedal angle required so as to achieve a kick-down to be greater and it is possible to select the pressure force and/or pedal angle required to achieve a target braking action that follows shortly afterwards to be smaller than in the case of a manual driving mode.

If, for example in a current driving situation, it is not necessary to accelerate the vehicle and the driver is not sufficiently awake in order to accelerate the vehicle, then the representation of the pedal operation for the driving pedal remains essentially suppressed while the representation of the pedal operation of the brake pedal is essentially unrestricted.

If, on the one hand, in a current driving situation, a braking action is not recommended because the vehicle is located for example on a railway crossing, then the representation of the operation of the brake pedal remains suppressed while the representation of the driving pedal operation is provided.

An intentional termination of such an operating mode by the driver expressing an explicit desire naturally remains unaffected by this.

Figure 2:
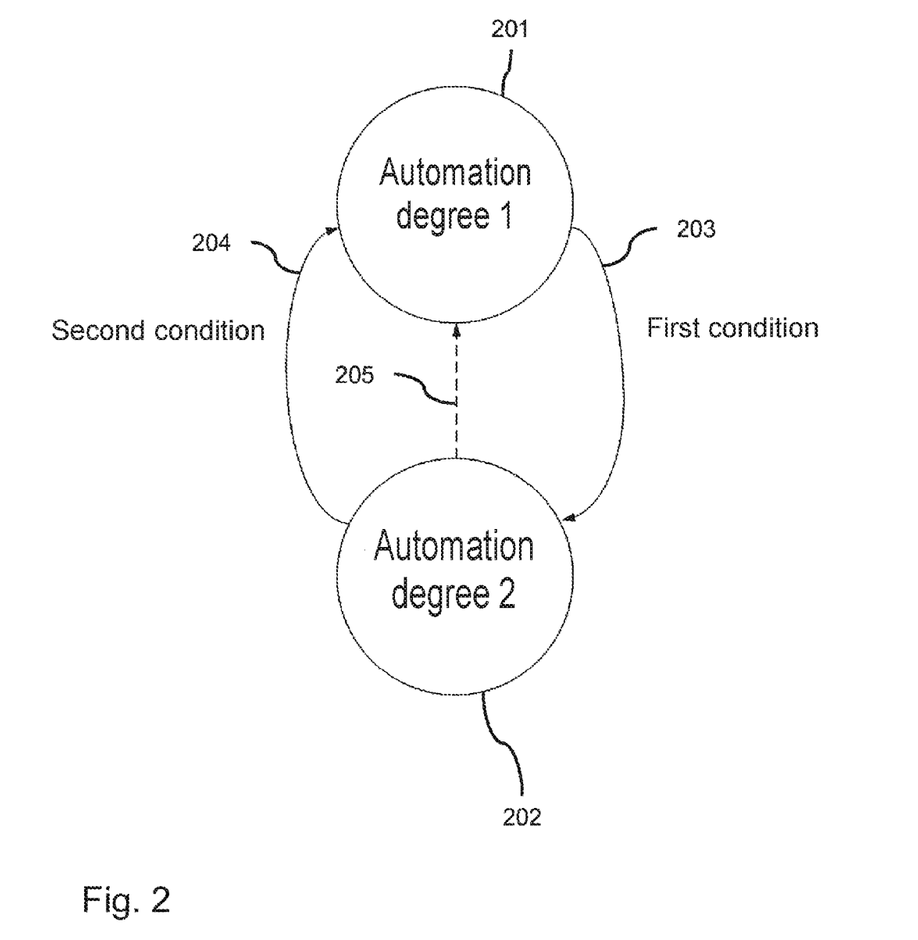
FIG. 2 is a state diagram that illustrates the control.

FIG. 2 illustrates an exemplary embodiment in the form of a simplified state diagram. The reference numeral 201 identifies a first state, 202 identifies a second state. The reference numerals 203, 204 and 205 represent state transitions between the first state 201 and the second state 202. The first state 201 represents a first degree of automation "automation degree 1" regarding an acceleration and/or deceleration control by the driver. The first degree of automation is allocated a first representation function that is configured for example in vehicles that do not have part-automated or highly automated driving functions.

If a first condition or a combination of first conditions for a return change of the representation function occur, the state transition 203 moves to the second state 202. The second state 202 represents a second degree of automation "automation degree 2" in which functions for a highly automated driving mode are activated. The second degree of automation is allocated a second representation function. The second representation function causes a restriction of the effects on the longitudinal dynamics of the vehicle. The second representation function may be different for the driving pedal and the brake pedal. By way of example, it is possible to provide for this purpose different second representation functions.

If a second condition or a combination of second conditions for the change of the representation function occur, the state transition 204 moves from the second state 202 to the first state 201.

The state transition 205 renders possible a transition from the second state 202 to the first state 201 with the aid of a redundant second condition, for example if the automation procedure drops out or fails.

LIST OF REFERENCE NUMERALS

1 Vehicle
10 Pedal system
11 Driving pedal
12 Brake pedal
13 Computing unit
14 Storage device 15 Signal (that represents the position/movement of the driving pedal)
16 Signal (that represents the position/movement of the brake signal)
17 Control parameter
18 Computing unit
201 First state
202 Second state
203 State transition
204 State transition
205 State transition The foregoing disclosure has been set forth merely to illustrate the embodiments of the invention and is not intended to be limiting. Since modifications of the disclosed embodiments incorporating the spirit and substance of the invention may occur to persons skilled in the art, the embodiments of the invention should be construed to include everything within the scope of the appended claims and equivalents thereof

What is claimed is:

1. A pedal system for a vehicle comprising:
a processor;
a driving pedal; and
a brake pedal,
wherein the pedal system is allocated a representation function between a pedal actuation and control parameters for the longitudinal control of the vehicle, the pedal system is configured so as, when the vehicle is being operated, to vary the representation function between the pedal actuation and the control parameters for the longitudinal control of the vehicle in dependence upon a variable that represents the degree of automation of the driving mode of the vehicle and at least a first condition for restricting the representation function of the pedal actuation and at least a second condition for eliminating the restriction of the representation function of the pedal actuation,
the representation function is a representation of a pressure force on, or a position of, the driving pedal or the brake pedal,
the variable representing the degree of automation may assume a first value and a second value representing a higher degree of automation than the first value, and the driving modes include at least two different driving modes of the following driving modes: a manual driving mode, an assisted driving mode, a part-automated driving mode, a highly automated driving mode, an automated driving mode, and an unknown driving mode,
wherein the processor is configured to:
ascertain one or more parameters of a driving situation;
ascertain the measure of the restriction of the representation function for the pedal system in dependence upon the one or more parameters that are ascertained for the driving situation; and
vary the representation function between the pedal actuation and the longitudinal control of the vehicle for the pedal system in dependence upon the ascertained measure of the restriction,
wherein the measure of restriction is dependent upon a necessity that is established using other means of the vehicle and a potential danger and a recommendation for action to perform a specific maneuver.

2. The pedal system as claimed in claim 1, wherein there is a predefined mathematical correlation between the restriction of the representation function of the pedal actuation for the driving pedal and the restriction of the representation function of the pedal actuation for the brake pedal.

3. The pedal system as claimed in claim 2, wherein said pedal system is configured so as to ascertain a measure of an anticipated success at least of the specific maneuver, in particular with regard to the current traffic situation and prevailing conditions within or outside the vehicle, and wherein the restriction of the representation function is dependent upon at least one ascertained measure of the anticipated success of the specific maneuver.

4. The pedal system as claimed in claim 3, wherein the at least one second condition for the driving pedal and the brake pedal comprises a take-over request with regard to the longitudinal control of the vehicle that is being performed by the driver.

5. The pedal system as claimed in claim 4, wherein the at least one second condition for the driving pedal and for the brake pedal comprises taking over a lateral control of the vehicle that is to be performed by the driver of the vehicle currently or in the future, in particular a readiness to steer and a steering action.

6. The pedal system as claimed in claim 5, wherein the at least one first condition and the at least one second condition is dependent upon a state of alertness of the driver.

7. The pedal system as claimed in claim 6, wherein said pedal system is configured so as to vary the representation of the pedal actuation of the driving pedal and of the brake pedal in a longitudinal control of the vehicle in dependence upon a current monitoring procedure and a preceding monitoring procedure of specific spatial regions in the area surrounding the vehicle.

8. The pedal system as claimed in claim 7, wherein said pedal system is configured so as, in dependence upon the representation of the pedal operation to vary, in particular restrict, the mechanical movability at least of one of the driving pedal and the brake pedal.

9. The pedal system as claimed in claim 8, wherein said pedal system is configured so as if there is a variation in the representation of the pedal actuation to perform an essential reduction of the pedal resilient force and retract at least one of the driving pedal and the brake pedal.

10. The pedal system as claimed in claim 9, wherein said pedal system is configured so as, in dependence upon a variable that represents the degree of automation of the driving mode of the vehicle, to vary one or more of the following parameters: at least one position limit when the at least one of the driving pedal and the brake pedal is locked; a resilient force of the at least one of the driving pedal and the brake pedal; the position of the at least one of the driving pedal and the brake pedal in a retracted state.

11. The pedal system as claimed in claim 10, wherein, the second condition, at least of one of the driving pedal and the brake pedal is dependent upon the preceding first condition of a same pedal and of the other pedal.

12. A vehicle having at least a part-automated driving mode and the pedal system in accordance with claim 11.

13. A pedal system for a vehicle comprising:
a processor;
a driving pedal; and
a brake pedal,
wherein the pedal system is allocated a representation function between a pedal actuation and control parameters for the longitudinal control of the vehicle, the pedal system is configured so as, when the vehicle is being operated, to vary the representation function between the pedal actuation and the control parameters for the longitudinal control of the vehicle in dependence upon a variable that represents the degree of automation of the driving mode of the vehicle and at least a first condition for restricting the representation function of the pedal actuation and at least a second condition for eliminating the restriction of the representation function of the pedal actuation, the representation function is a representation of a pressure force on, or a position of, the driving pedal or the brake pedal, the variable representing the degree of automation may assume a first value and a second value representing a higher degree of automation than the first value, and the driving modes include at least two different driving modes of the following driving modes: a manual driving mode, an assisted driving mode, a part-automated driving mode, a highly automated driving mode, an automated driving mode, and an unknown driving mode, wherein the pedal system is configured, so as in dependence upon a variable of the travel of the vehicle, to vary at least one position limit when the driving pedal or the brake pedal is locked.

14. A pedal system for a vehicle comprising:
a processor;
a driving pedal; and
a brake pedal,
wherein the pedal system is allocated a representation function between a pedal actuation and control parameters for the longitudinal control of the vehicle, the pedal system is configured so as, when the vehicle is being operated, to vary the representation function between the pedal actuation and the control parameters for the longitudinal control of the vehicle in dependence upon a variable that represents the degree of automation of the driving mode of the vehicle and at least a first condition for restricting the representation function of the pedal actuation and at least a second condition for eliminating the restriction of the representation function of the pedal actuation, the representation function is a representation of a pressure force on, or a position of, the driving pedal or the brake pedal, the variable representing the degree of automation may assume a first value and a second value representing a higher degree of automation than the first value, and the driving modes include at least two different driving modes of the following driving modes: a manual driving mode, an assisted driving mode, a part-automated driving mode, a highly automated driving mode, an automated driving mode, and an unknown driving mode, wherein the pedal system is configured, so as in dependence upon a variable of the travel of the vehicle, to vary the brake pedal or the driving pedal resilient force.

15. A pedal system for a vehicle comprising:
a processor;
a driving pedal; and
a brake pedal,
wherein the pedal system is allocated a representation function between a pedal actuation and control parameters for the longitudinal control of the vehicle, the pedal system is configured so as, when the vehicle is being operated, to vary the representation function between the pedal actuation and the control parameters for the longitudinal control of the vehicle in dependence upon a variable that represents the degree of automation of the driving mode of the vehicle and at least a first condition for restricting the representation function of the pedal actuation and at least a second condition for eliminating the restriction of the representation function of the pedal actuation, the representation function is a representation of a pressure force on, or a position of, the driving pedal or the brake pedal, the variable representing the degree of automation may assume a first value and a second value representing a higher degree of automation than the first value, and the driving modes include at least two different driving modes of the following driving modes: a manual driving mode, an assisted driving mode, a part-automated driving mode, a highly automated driving mode, an automated driving mode, and an unknown driving mode, wherein the pedal system is configured, so as in dependence upon a variable of the travel of the vehicle, to vary the brake pedal or the driving pedal resilient force.

* * * * *